United States Patent
Mossberg et al.

(10) Patent No.: US 6,678,429 B2
(45) Date of Patent: Jan. 13, 2004

(54) AMPLITUDE AND PHASE CONTROL IN DISTRIBUTED OPTICAL STRUCTURES

(75) Inventors: Thomas W. Mossberg, Eugene, OR (US); Christoph M. Greiner, Eugene, OR (US)

(73) Assignee: LightSmyth Technologies, Inc., Eugene, OR (US)

( * ) Notice: Subject to any disclaimer, the term of this patent is extended or adjusted under 35 U.S.C. 154(b) by 0 days.

(21) Appl. No.: 10/229,444

(22) Filed: Aug. 27, 2002

(65) Prior Publication Data

US 2003/0039444 A1 Feb. 27, 2003

Related U.S. Application Data

(60) Provisional application No. 60/315,302, filed on Aug. 27, 2001, and provisional application No. 60/370,182, filed on Apr. 4, 2002.

(51) Int. Cl.[7] .............................................. G02F 1/295
(52) U.S. Cl. .............................. 385/10; 385/37; 385/3; 385/14; 359/565; 359/569
(58) Field of Search .............................. 385/37, 36, 14, 385/123, 8, 9, 10, 3, 1; 359/565, 569, 566, 570, 576

(56) References Cited

U.S. PATENT DOCUMENTS

| 3,995,937 A | 12/1976 | Baues et al. |
| 6,144,480 A | 11/2000 | Li et al. .................... 385/37 X |
| 6,473,232 B2 * | 10/2002 | Ogawa ........................ 359/565 |

FOREIGN PATENT DOCUMENTS

| WO | WO 99/56159 | 11/1999 |
| WO | WO 02/075411 | 9/2002 |

OTHER PUBLICATIONS

Mossberg, T.W.; "Planar Holographic Optical Processing Devices," 2001 Optical Society of America; Optics Letters, vol. 26, No. 7; Apr. 1, 2001.

Lohmann et al., "Graphic Codes for Computer Holography," Applied Optics, vol. 34, No. 17; Jun. 10, 1995.

Hirayama et al., "Novel Surface Emitting Laser Diode Using Photonic Band–Gap Cavity," Appl. Phys. Lett. 69(6), Aug. 5, 1996.

* cited by examiner

*Primary Examiner*—Phan T. H. Palmer
(74) *Attorney, Agent, or Firm*—David S. Alavi

(57) ABSTRACT

An optical element is provided with one or more sets of diffractive elements. Individual diffractive element transfer functions collectively yield corresponding overall transfer functions between corresponding entrance and exit ports. Diffractive elements are defined by contours that include diffracting region(s) altered to diffract, reflect, and/or scatter incident optical fields (altered index, surface, etc). Element transfer functions are determined by: fraction of contour filled by diffracting region(s) (partial-fill grayscale); and/or the spatial profile of the diffracting region(s) (profile-based grayscale). Optical elements may be configured: as planar or channel waveguides, with curvilinear diffracting segments; to support three-dimensional propagation with surface areal diffracting segments; as a diffraction grating, with grating groove segments. These devices may have one or more ports, and may provide one or more spatial/spectral transfer functions between the ports with spatially overlapping sets of diffractive elements.

93 Claims, 8 Drawing Sheets

AMPLITUDE AND PHASE CONTROL IN DISTRIBUTED OPTICAL STRUCTURES

RELATED APPLICATIONS

This application claims benefit of prior-filed co-pending provisional App. No. 60/315,302 entitled "Effective gray scale in lithographically scribed planar holographic devices" (Docket No. 5455P007Z) filed Aug. 27, 2001 in the name of Thomas W. Mossberg. This application claims benefit of prior-filed co-pending provisional App. No. 60/370,182 entitled "Amplitude and phase controlled diffractive elements" filed Apr. 4, 2002 in the names of Thomas W. Mossberg and Christoph M. Greiner.

FIELD OF THE INVENTION

The field of the present invention relates to distributed optical devices. In particular, apparatus and methods are described herein for employing individual element amplitude and phase control in distributed optical structures.

BACKGROUND

Distributed optical structures in one-, two-, or three-dimensional geometries offer powerful optical functionality and enable entirely new families of devices for use in a variety of areas including optical communications, spectral sensing, optical waveform coding, optical waveform processing, and optical waveform recognition. It is important in the design of distributed optical structures to have means to control the amplitude and phase of the electromagnetic field diffracted by individual diffractive elements within the overall distributed structure. This invention relates to approaches for fabricating diffractive elements that provide flexible control over diffractive amplitude and phase.

A distributed optical structure typically includes a large number of individual diffractive elements. Each individual diffractive element may scatter (and/or reflect and/or diffract) only a small portion of the total light incident on the distributed structure. This may be because the individual diffractive elements subtend only a small fraction of available solid angle of the incident optical field in the interaction region, and/or because individual diffractive elements have a small reflection, diffraction, or scattering coefficient. Distributed optical structures in two or three dimensions can also be described as volume holograms since they have the capability to transform the spatial and spectral properties of input beams to desired forms.

There are many reasons why it is important to have control over the amplitude and/or phase of the portions of the field scattered by individual diffractive elements. For example, a distributed optical structure can act as a general spectral filter supporting a broad range of transfer functions. In the weak-reflection approximation, the spectral transfer function of a structure is approximately proportional to the spatial Fourier transform of the structure's complex-valued scattering coefficient—as determined by the amplitude and phase of the field scattered by individual diffractive elements (See T. W. Mossberg, Optics Letters 26, 414 (2001) and the provisional applications cited hereinabove). In order to produce a general spectral transfer function, it is useful to control the amplitude and phase of each constituent diffractive element. Application of the present invention provides for such control. Also, when multiple distributed structures are overlaid in the same spatial region, system linearity can only be maintained by ensuring that the diffractive strength of overlaid diffractive elements is the sum of the individual diffractive element strengths. When diffractive elements are lithographically scribed, overlaid structures will not typically produce a summed response. The approaches of the present invention provide means for modifying overlaid diffractive elements (formed by lithographic and/or other suitable means) so that each element negligibly affects another's transfer function.

SUMMARY

An optical apparatus according to the present invention comprises an optical element provided with at least one set of at least two diffractive elements. Each diffractive element diffracts a corresponding diffracted component of an incident optical field with a corresponding diffractive element transfer function. Collectively, the diffractive elements provide an overall transfer function between an entrance optical port and an exit optical port (which may be defined structurally and/or functionally). Each diffractive element is spatially defined by a corresponding diffractive element contour and includes at least one diffracting region of the corresponding contour modified in some way so as to diffract, reflect, and/or scatter a portion of an incident optical field. The modification of the contour typically involves a differential between some optical property of the diffracting region relative to the corresponding average optical property of the optical element (effective index, bulk index, surface profile, and so forth). At least one of: i) the overall transfer function; and ii) at least one corresponding diffractive element transfer function, is determined at least in part by at least one of: a) a less-than-unity fill factor for the corresponding contour; b) a non-uniform distribution of multiple diffracting regions of the corresponding contour; c) variation of a spatial profile of the optical property along the at least one diffracting region of the corresponding contour; d) variation of a spatial profile of the optical property among multiple diffracting regions of the corresponding contour; and e) variation of the spatial profile of the optical property of the at least one diffracting region among the elements in the diffractive element set.

The optical element may be a planar or channel waveguide, with optical field propagation substantially confined in at least one transverse dimension. In a waveguide, the diffracting segments are curvilinear segments having some alteration of an optical property relative to the waveguide. The optical element may enable three-dimensional propagation of optical fields therein, with the diffracting segments being surface areal segments of surface contours within the volume of the optical element. The optical element may be a diffraction grating, the diffracting segments being segments of the grating lines groove contours that are formed on the grating. These various distributed optical devices may define one or more ports, and may provide one or more spatial/spectral transfer functions between the one or more ports.

Various objects and advantages of the present invention may become apparent upon referring to the preferred and alternative embodiments of the present invention as illustrated in the drawings and described in the following written description and/or claims.

Figure 1:
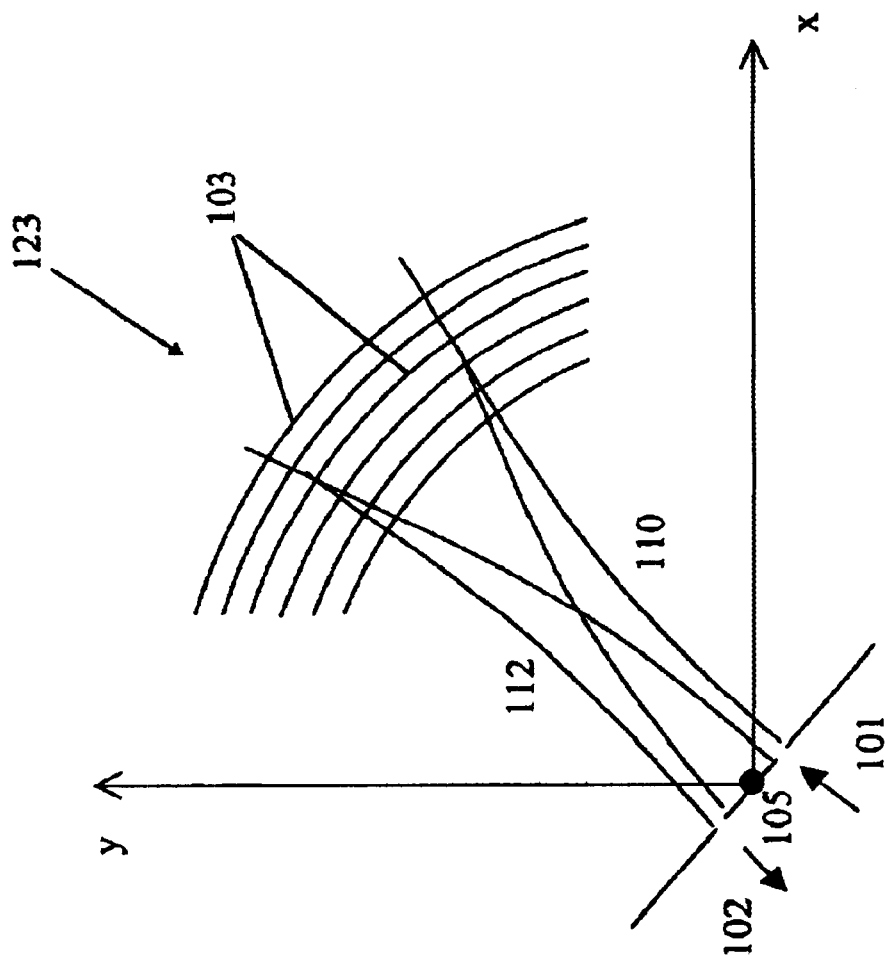
FIG. 1 is a schematic diagram of a distributed optical device implemented in a planar optical waveguide.

In the Figures, it should be noted that many of the embodiments depicted are only shown schematically, and that not all features may be shown in full detail or in proper proportion. Certain features or structures may be exaggerated relative to others for clarity. It should also be noted that the embodiments shown in the Figures are exemplary only, and should not be construed as specifically limiting the scope of the written description or the claims set forth herein.

DETAILED DESCRIPTION OF PREFERRED AND ALTERNATIVE EMBODIMENTS

Definitions

Diffractive Element: Generalization of a single line or groove in a standard surface-type diffraction grating. In general, a diffractive element may comprise one or more diffracting regions thereof, the diffracting regions having one or more altered optical properties so as to enable diffraction (and/or reflection and/or scattering) of a portion of an incident optical field therefrom. Such optical property alterations may include: refractive index variations or modulations in, on, and/or near an optical element or a waveguide medium; trenches or grooves etched into one or more surfaces of an optical element or a waveguide structure (core and/or cladding); ribs extending out from one or more surfaces of an optical element or a waveguide structure (core and/or cladding); metallic, dielectric, multi-layer, and/or other coating elements in, on, or near an optical element or a waveguide structure (core and/or cladding); and/or other one or more altered optical properties in the interior, on the surface(s), or in the proximity of an optical element or a waveguide active to diffract, reflect, and/or scatter incident light. In one- or two-dimensional waveguide-based diffractive structures, diffractive elements may include generalized curves active to diffract, reflect, and/or scatter a portion of an incident optical field. In three-dimensional diffractive structures, diffractive elements may include generalized surfaces having one or more altered optical properties so as to diffract, reflect, and/or scatter a portion of an incident optical field. In diffraction-grating-type diffractive structures, diffractive elements may include grating lines and/or grooves (full and/or partial) having one or more altered optical properties so as to diffract, reflect, and/or scatter a portion of an incident optical field.

Distributed Optical Structure: A collection of two or more diffractive elements spanning a region of space that are collectively active to diffract or reflect at least a portion of an input optical field, thereby creating an output field whose spectral and spatial properties differ from those of the input field in a manner determined by the structure of individual constituent diffractive elements and the detailed relative arrangement of the constituent diffractive elements.

Field Amplitude: The peak value of an oscillatory field interactive with a distributed optical structure. Interactive fields may include input and output fields. Field amplitude may be a function of wavelength, position, and/or propagation direction.

Field Phase: The difference in oscillatory phase of an interactive oscillatory field compared to a reference oscillatory field as a function of wavelength, position, and/or propagation direction.

Diffractive Element Transfer Function: A function of wavelength, position, and/or propagation direction relating the field amplitude and field phase of an optical field diffracted, reflected, and/or scattered from a single diffractive element to the field phase and field amplitude of an optical field incident on the diffractive element.

Collective Transfer Function: Alternatively, distributed optical transfer function, overall transfer function, overall set transfer function, diffractive element set transfer function, device transfer function, port-to-port transfer function, and so forth. A function of wavelength, position, and/or propagation direction relating the field amplitude and field phase of an optical field diffracted, reflected, and/or scattered from a distributed optical structure (comprising one or more constituent diffractive elements) to the field phase and field amplitude of an optical field incident on the distributed optical structure. In the limit of weak diffraction by each element (so that multiple diffractions can be neglected), such a collective transfer function is typically a coherent superposition of the diffractive element transfer functions of the constituent diffractive elements. In cases where the diffraction by each element is sufficiently strong (so that multiple diffractions cannot be neglected), the relationship between the various element transfer functions and the collective transfer function will be more complicated.

Planar Waveguide: Alternatively, a two-dimensional waveguide. Any transmissive structure of relatively large extent in two dimensions and relatively thin in a third dimension whose boundary reflection properties lead to substantial confinement of certain optical fields propagating nearly parallel to the structure's extended directions (i.e., substantial confinement in one transverse dimension). A planar waveguide may be flat or curved according to whether the thin dimension corresponds to a substantially fixed spatial direction or a position-dependent spatial direction, respectively.

Channel Waveguide: Alternatively, a one-dimensional waveguide. Any transmissive structure of relatively large extent in one dimension and relatively thin in the remaining two dimensions whose boundary reflection properties lead to substantial confinement of certain fields propagating nearly parallel to the structure's single extended direction (i.e., substantial confinement in two transverse dimensions). A channel waveguide may be straight or curved according to whether the thin dimensions correspond to substantially fixed spatial directions or position-dependent spatial directions, respectively.

Fill Factor: A number between 0 and 1 representing the fraction of a predefined line, curve, surface, and/or other contour that is marked, scribed, or otherwise altered in some manner to form one or more diffracting regions. For a curvilinear contour, the fill factor may be determined by the sum of the lengths of all altered (i.e., diffracting) segments of the contour divided by the total contour length. For a surface contour, the fill factor may be determined by the sum of the surface areas of all altered (i.e., diffracting) surface areal segments of the contour divided by the total contour surface area.

Fill Distribution: a function of position on a contour indicating whether a given point on the contour has been altered or not to form a diffracting region. Integrated over an entire contour, the fill distribution would yield the fill factor (see above). Integrated over a region of the contour, the fill distribution may be interpreted as defining a "local fill factor" for the region.

Optical Port: A structurally and/or functionally defined region of space through which an optical field enters or exits an optical device, characterized by position and/or propagation direction. For example, incident and diffracted angles relative to a diffraction grating would be an example of a functionally-defined optical port defined by propagation direction, while an end face of a channel waveguide would be an example of a structurally-defined optical port defined by position. A given optical device may have one or more ports, and any given port may function as an entrance optical port, an exit optical port, or both.

Exemplary Diffractive Element Geometries

Consider the substantially flat exemplary planar waveguide structure shown in FIG. 1. A plane containing one boundary (upper or lower) of the planar waveguide is spanned by the x and y coordinates. The waveguide structure occupies a certain region of the xy plane and has a thickness $\Delta z$ which is substantially constant except for thickness variations that may be associated with diffractive elements. The thickness $\Delta z$ is typically 4 to 8 times the in-medium design wavelength of the device but can be less (provided that propagating waveguide field modes are nevertheless supported by the planar waveguide) or greater (provided that modal dispersion does not appreciably broaden the spectral response of relevant distributed optical structures). At typical telecommunication wavelengths ($\lambda_{air} \sim 1.5$ $\mu$m), the thickness of the planar waveguide may be about 6 $\mu$m if the waveguide medium is silica. In the exemplary embodiment of FIG. 1, light enters the planar waveguide through optical port 101 (via a channel waveguide, edge mounted fiber, surface grating coupler, free space propagation, or any other suitable optical input means), propagates within the planar waveguide (in this example expanding in region 110), encounters distributed optical structure 123, and diffracts from diffractive elements 103. The diffractive elements 103 are positioned and adapted so that diffracted light in region 112 possesses field amplitude/phase well-suited for transmission through optical port 102, through which light may exit the device and propagate away (by free space propagation or propagation through a channel waveguide, butt-coupled fiber, surface grating coupler, or any other suitable optical coupling device). The contour of individual diffractive elements 103 in the xy plane may preferably chosen so as to collectively transform the field amplitude/phase of the input signal to be optimally suited for transmission through output port 102. The diffractive elements, considered collectively, comprise a hologram with powerful field amplitude/phase mapping and/or spectral filtering capability through the collective transfer function of distributed optical structure 123. The diffractive elements 103 are shown in this example as simple circular arcs having a common center 105, which is approximately midway between the optical ports 101 and 102. Circular arcs may not necessarily provide optimal mapping of the input field amplitude/phase onto the output optical port. More generally, the diffractive elements 103 may comprise contours more complex than simple conic sections.

Figure 2:
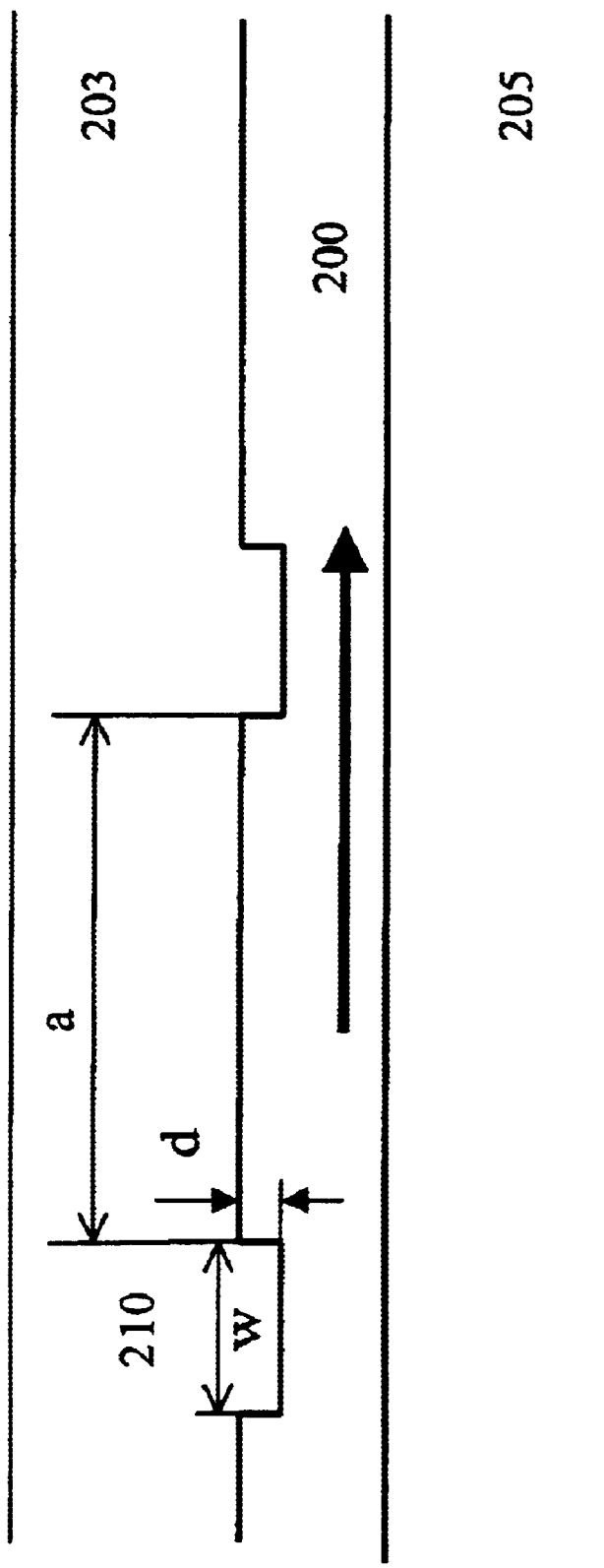
FIG. 2 is a cross-sectional view of a pair of individual diffractive elements of a distributed optical device.

An enlarged cross sectional view of an exemplary planar waveguide structure including two of the individual diffractive elements is shown in FIG. 2. The cross sectional plane of FIG. 2 is parallel to the z direction and contains the point 105 in FIG. 1. In FIG. 1, the actual structure of the diffractive elements is not resolved and they appear simply as lines 103. In the exemplary case of FIG. 2, the diffractive elements comprise trenches etched or otherwise scribed into one surface of the planar waveguide core 200. Typically, but not necessarily, the region above and below the waveguide core 200 is filled with a transparent dielectric material, upper cladding 203 and lower cladding 205, having an index of refraction that is smaller than that of core 200. Input fields incident on the distributed optical structure are primarily localized in the core 200. Alternatively, the diffractive elements may comprise: bulk index of refraction changes in the core and/or cladding layers; index of refraction variations, modulations, and/or discontinuities created internal to the planar waveguide during fabrication by lithographic or other means; rib-like structures extending from the waveguide plane, including in the limit of very short ribs metallic and/or dielectric coating elements; and/or any structural element active to diffract, reflect, and/or scatter a portion of the input field.

A diffractive element trench shown, 210, has a width w and a depth d in the planar waveguide core 200. It would be useful to have the ability to independently vary the depth of the various diffractive elements (and/or the shapes of the trenches) since such ability would provide for independent control of the relative diffractive amplitudes of the individual diffractive elements. However, depth/shape control within a single distributed optical structure creates significant fabrication challenges. Similarly, heights/shapes of protruding ribs or the magnitudes/profiles of index modulations could also provide diffracted amplitude control for individual diffractive elements, but also introduce significant fabrication challenges.

The present invention includes apparatus and methods for controlling the diffractive scattering amplitude of individual diffractive elements, while mitigating fabrication difficulties. A preferred technique is referred to herein as partial-fill gray scale. Another preferred technique is referred to herein as width-based gray scale. Some aspects of these techniques have been disclosed in above-cited provisional patent App. No. 60/315,302 by Mossberg and provisional patent App. No. 60/370,182 by Mossberg and Greiner. It should be noted in the ensuing discussion that any references to partial scribing of trench- or groove-like diffractive elements may be equivalently applicable to partial fabrication, alteration, and/or impression of protruding, rib-like, index-modulated, and/or other types of diffractive elements.

Partial-fill Gray Scale

The instantaneous output signal generated at a particular position by a distributed optical structure such as that shown in FIG. 1 contains contributions from the light scattered from each point along the length of each diffractive element. The net contribution made by a particular diffractive element to the output signal at a particular time and position may be regarded to be the spatial integral of the product of the diffractive element amplitude at each point along its contour and the amplitude of the input field that was incident on the diffractive element point a propagation time earlier. In computing the aforementioned integral, optical phase must be taken into account. In cases where all points on a diffractive element contour contribute with essentially the same phase, as for example at the output port 102 in FIG. 1, the integral nature of the diffractive element contribution to the output field allows amplitude control from an individual diffractive element through control of the fraction of the nominally continuous contour that is actually scribed, index-modulated, fabricated, or otherwise altered to form one or more diffracting regions. In situations where various points along a diffractive element contour contribute with position-dependent phases, the net amplitude of the diffractive element may still be controlled by selectively altering only portions of the diffractive element contour to form one or more diffracting regions. In such cases, however, the relationship between amplitude and fill factor (of the alteration) becomes more complex and detailed consideration of the destructive or constructive nature of the contribution from each contour point must be taken into account.

Figure 3:
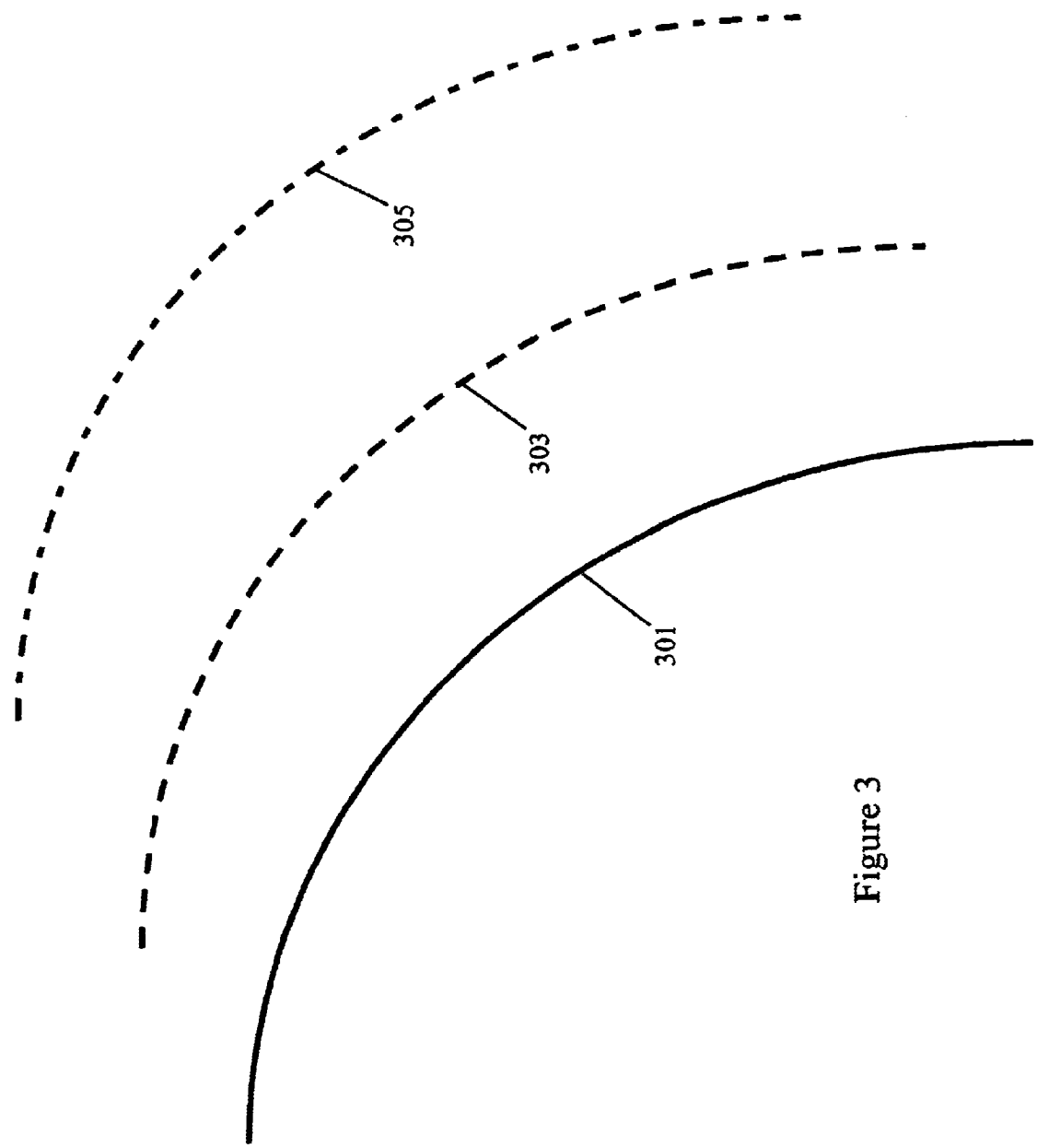
FIG. 3 schematically illustrates diffractive elements having differing fill factors according to the present invention.

FIG. 3 exemplifies diffractive element amplitude control by partial contour scribing in the case that the entire contour contributes to the output signal with essentially constant phase. In FIG. 3, three different diffractive elements having similar contours but with three different fill factors and/or distributions are depicted. In diffractive element 301, 100 percent of the diffractive element contour is altered (as indicated by the continuous dark line) by creating a trench, for example. In contour 303, portions of the diffractive element contour are not scribed (indicated by the breaks in the dark line). The net amplitude of diffractive element 303 compared to that of diffractive element 301 is given by the ratio of their integrated contributions to the output signal. Ignoring spatial variations in the input signal, the relative diffractive amplitudes of elements 301 and 303 are in proportion to their fill factors (i.e., in proportion to the fraction of the contour altered to form one or more diffracting regions). The exact ratio of the diffractive amplitudes of the elements is influenced by the spatial variation of the input field and is given by the ratio of the integrals of diffractive element amplitude multiplied by local input field amplitude along the respective diffractive element contours. When the diffractive elements are finely divided into many diffracting regions so that the input field amplitude is relatively constant over successive contour regions, the relative diffractive element amplitudes are reasonably approximated simply by the fill factors of respective diffractive elements.

Diffractive element 305 has yet a different fill distribution and factor. By controlling the fraction of a given diffractive element contour that is scribed or otherwise written with a trench, rib, or other scattering mechanism to form one or more diffracting regions, one can continuously control the effective amplitude of the diffractive element. Note that partial scribing of the diffractive element contour provides effective amplitude control without changing diffractive element height/depth, cross-section, shape, or structure. If etched trenches or ribs are utilized as diffractive elements, partial diffractive element contour filling provides a means of achieving control over diffractive element amplitude without requiring control over etch depth or width, thereby vastly simplifying fabrication. Trenches or ribs of fixed cross-section can be written or not written in binary fashion along the diffractive element contour, which is easily accomplished with standard lithographic techniques. Control of etch depth to different levels on a single planar waveguide to control diffractive element amplitude is lithographically challenging. Partial-fill gray scale provides a solution to diffractive element amplitude control that does not require etch depth variation within the distributed optical structure. Controlled variation of etch depth may nevertheless be used in combination with partial-fill gray scale. It should be noted that fill patterns used in the control of net diffractive element amplitude may include randomness in order to suppress constructive interference in undesired output areas. If the fill pattern is regular, cases may arise where grating type effects lead to undesired output signal orders. However, such additional output signal order from a regular fill pattern may be exploited for providing additional device functionality.

The partial-fill gray scale apparatus and methods according to the present invention may be employed in any diffractive device or structure where output signals derive from extended sources either in the form of a curvi-linear contour or a surface. Partial population (i.e., partial filling) of the contour or surface with a scattering, reflecting, or diffracting mechanism to form one or more diffracting regions provides a simple approach to controlling the relative output amplitude from that contour or surface compared to other contours or surfaces. Partial-fill gray scale may be implemented with smoothly varying diffractive element amplitude as well as binary scribing and non-scribing.

Figure 4:
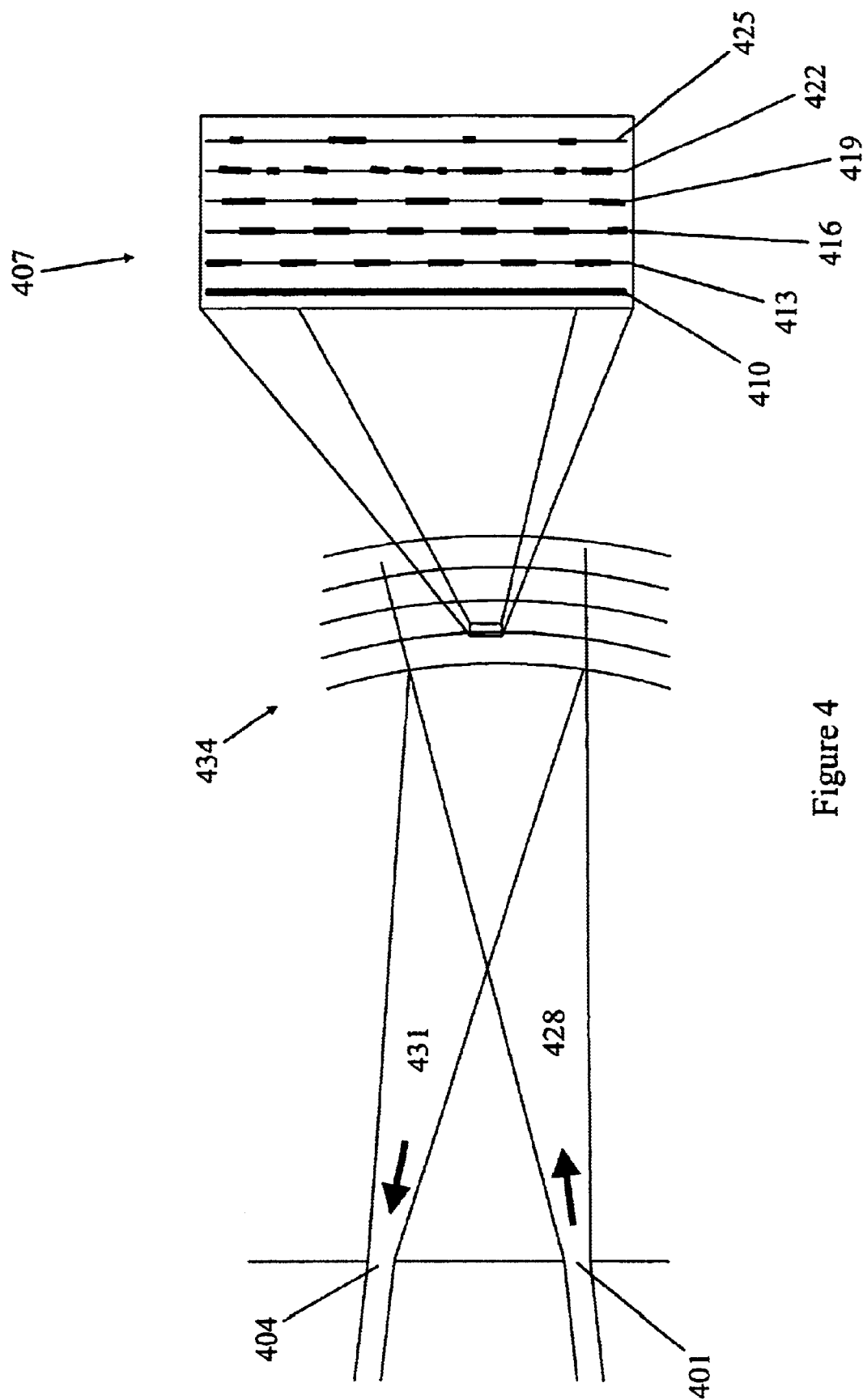
FIG. 4 is a schematic diagram of a two-port distributed optical device implemented in a planar optical waveguide according to the present invention.

FIG. 4 shows an exemplary embodiment of the present invention comprising a two-port planar waveguide. In this example, partial-fill gray scale is used to create diffractive elements of various effective amplitudes in a planar waveguide two-port filter device. FIG. 4 is a top view of the two-port planar waveguide device and fields propagate substantially within the plane of the Figure. Light may enter the device through an input port 401 (from an input channel waveguide in this example) and expands in region 428 of the planar waveguide before encountering distributed optical structure 434. Distributed optical structure 434 comprises two or more diffractive elements, typically many diffractive elements (potentially ranging between 2 elements and $10^6$ elements; on the order of $10^3$–$10^4$ elements may be employed in typical devices). Individual diffractive elements are too small to be seen in the overall view of the distributed optical structure and typically have a separation of an integer number of half wavelengths of a reflected field (wavelength inside the planar waveguide medium). The diffractive elements collectively generate an output signal which converges through region 431 of the planar waveguide and exits the device through output port 404 (into an output channel waveguide in this example). The spatial patterning of the diffractive element contours in the distributed optical structure may be configured for generating an output signal spatially well-matched to the output port 404. An enlarged diagram, 407, showing individual diffractive elements within the distributed optical structure is also shown. In this exemplary embodiment where the input signal is optical radiation of vacuum wavelength 1.54 microns, the diffractive elements consist of trenches of about 0.25 micron width and 0.4 micron depth etched into one surface of the planar waveguide core using standard lithographic techniques. The planar waveguide of the exemplary embodiment may comprise silica-based core and cladding layers, but may alternatively consist of polymer, silicon, III–V semiconductors, other semiconductors, or any other suitable medium transmissive to the input field employed.

Individual diffractive element contours are preferably configured to optimally direct a portion of the incident optical field onto the output port. To control relative diffractive amplitudes of the individual contours, differing fractions and distributions of each of the diffractive element contours are scribed with trenches to form one or more diffracting regions. Contour 410 corresponds to a diffractive element that has maximal (unity) relative amplitude and is therefore scribed with a trench over its entire length. Contours 413, 416, 419, and 422 all correspond to diffractive elements having relative amplitude of about 0.5. In each case, 50 percent of the contour length is scribed with a trench. The length of individual scribed segments (i.e., diffracting regions) is widely variable, a lower limit being determined primarily by lithographic resolution and an upper limit being determined primarily by the input field width. However, dependence of individual contour amplitude on the input field spatial distribution can be avoided by employing a number of scribed segments across the input beam width comparable or greater than the number of gray scale resolution levels desired (e.g. at least 50 scribed segments to achieve 50-level gray scale).

Additional aspects applicable to the present invention are apparent from more detailed consideration of diffractive elements 413, 416, 419, 422, and 425. It will be noted that diffractive elements 413 and 416 are scribed with substantially identical regular patterns, having substantially equal-length segments of scribed and unscribed contour segments (resulting in a fill factor of about 0.5). It will be further noted that the scribed segments (i.e., diffracting regions) of diffractive element 416 are laterally displaced from those of diffractive element 413. Considering diffractive elements 413 and 416 together, their combined scribed sections essentially uniformly span the transverse extent of the input field. Implementations of the present invention may typically ensure that any given portion of the input field spatial distribution "sees" about the same number of scribed (or otherwise diffracting, reflecting, and/or scattering) contour segments as it propagates into distributed optical structure 434, by including suitably laterally offset scribed portions of the diffractive element contours. Such usage of partial-fill gray scale may ensure that the scribed portions of the set of diffractive elements comprising the distributed optical structure essentially uniformly span the transverse spatial distribution of the input field. Such arrangement of scribed contour segments may substantially reduce insertion loss by reducing the fraction of the input field distribution that may propagate through the distributed optical structure without interaction with a scribed diffractive element segment. Such arrangement of scribed sections is of lessening importance as the size of gaps between scribed sections decreases. With smaller gaps between scribed sections, diffraction begins to couple the input field into shadowed regions behind scribed sections of diffractive elements.

Diffractive element 419 also has a fill factor of about 0.5 (i.e. trenches are scribed on about 50 percent of the diffractive element contour, and, like diffractive elements 413 and 416, has spaces and trenches of substantially equal length). However, the scribed and unscribed segments of diffractive element 419 are of a different length than is the case for elements 413 and 416 (i.e. element 419 has a fill pattern of a different periodicity). Such a mixture of trench fill patterns having differing periodicities is advantageous as a means for reducing coherently scattered light in unwanted output directions. Conversely, ordered arrays of diffractive elements having the same periodicity may be employed for generating multiple output signals through multiple output ports through coherent scattering. Diffractive element 422 illustrates an alternative means for reducing coherent scatter in unwanted output directions. The trenches comprising diffractive element 422 have irregular lengths and separations, while maintaining an overall fill factor of about 0.5. The irregular fill pattern minimizes coherent scattering in unwanted output directions. As a final example, diffractive element 425 has a fill factor of about 0.2 and an irregular fill pattern. The relative diffractive amplitude of element 425 is approximately 0.2.

It may be desirable to vary the fill factor along a given contour (i.e., vary the local fill factor), thereby varying the diffracted amplitude as a function of position along the contour. This additional degree of freedom may be exploited, for example, to flatten out an incident field distribution. An incident field distribution with relatively larger amplitude in the center and relatively smaller amplitude at the periphery, for example, may be transformed into a more uniform field amplitude distribution by diffractive elements having smaller fill factors near the center and larger fill factors near the periphery. Other such scenarios may be readily implemented.

Diffractive elements need not be trenches. They may be any structural element, constituent, and/or optical property alteration active to diffract, reflect, and/or scatter a portion of the input field and may comprise trenches, ribs, or other suitable type of refractive index variation on or near one or both of the waveguide surfaces, and/or within the waveguide interior. Suitable diffractive elements may comprise: bulk index of refraction changes in the core and/or cladding layers; index of refraction variations, modulations, and/or discontinuities created internal to the planar waveguide during fabrication by lithographic or other means; groove- or trench-like structures in, on, or near the waveguide; rib-like structures extending from the waveguide plane, including in the limit of very short ribs metallic and/or dielectric coating elements; and/or any structural element active to diffract, reflect, and/or scatter a portion of the input field. The present invention may be implemented with continuous variations in local diffractive element amplitude rather than the discrete variations described in this exemplary embodiment.

Figure 5:
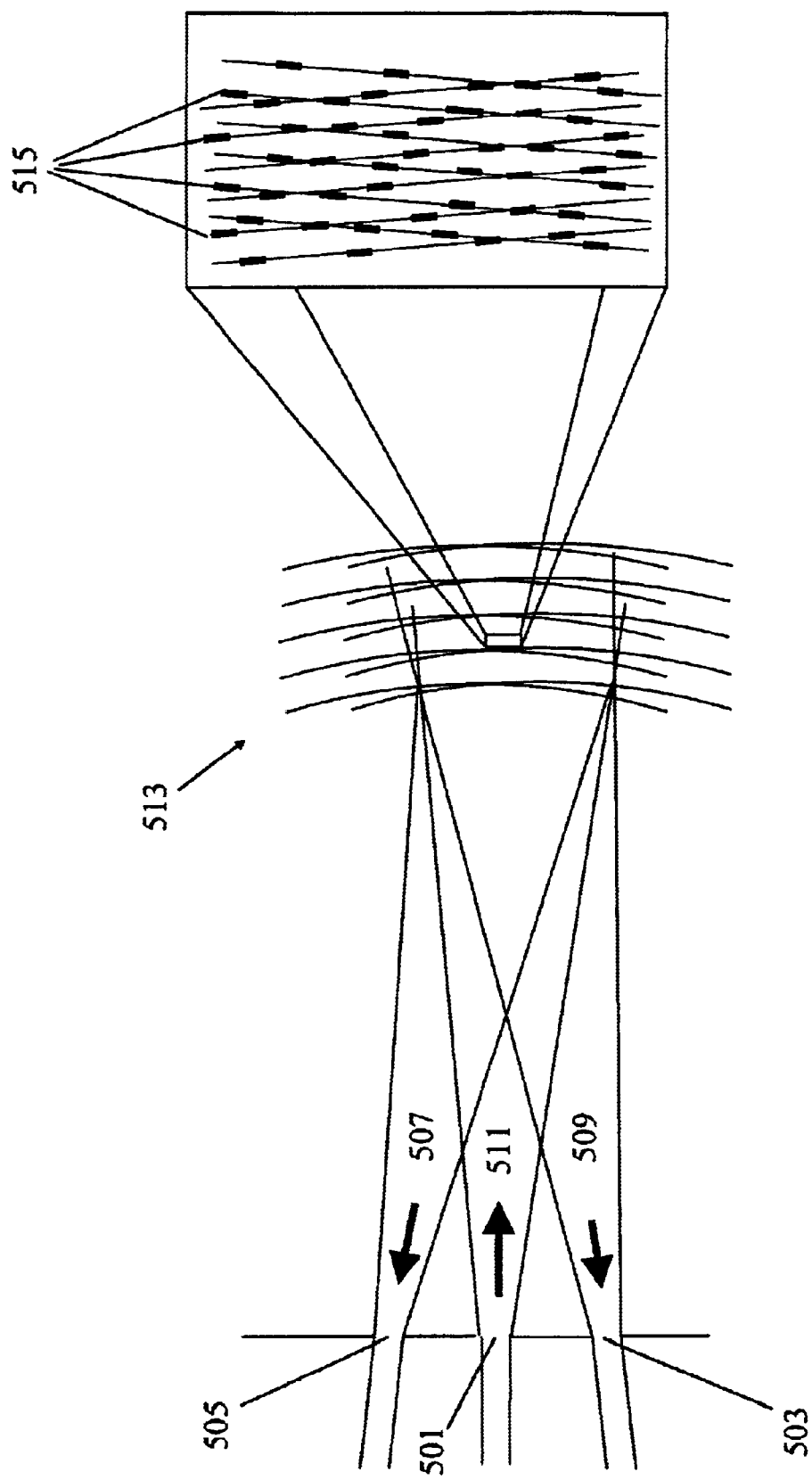
FIG. 5 is a schematic diagram of a three-port distributed optical device implemented in a planar optical waveguide according to the present invention.

A three-port exemplary embodiment of the present invention is depicted in FIG. 5. In this embodiment, partial-fill gray scale construction of diffractive elements is employed in the fabrication of a planar waveguide dual-component distributed optical structure which is comprised of two distributed optical structures (implemented as described hereinabove), each of which provides a separate spatial and spectral transfer function. In the embodiment of FIG. 5, an input field enters via input port 501 (through a channel waveguide, butt-coupled fiber, or any other suitable coupling means). The input field expands in region 511 of the planar waveguide and encounters the dual-component distributed optical structure 513. The dual-component distributed optical structure consists of two separate sets of diffractive elements, a first component set and a second component set. The first set of diffractive elements directs light from the input field to create a first output field which propagates through region 509 to a first output port 503, which may be any suitable type of output port. The first output field is related to the input field via a first spatial and spectral transfer function characteristic of the first component set of diffractive elements. The second set of diffractive elements directs light from the input field to create a second output field which propagates through region 507 and exits through output port 505, which may be any suitable type of output port. The second output field is related to the input field via a second spatial and spectral transfer function characteristic of the second set of diffractive elements. The first and second set of diffractive elements will generally overlap in some regions of the distributed optical structure.

The transfer functions of the first and second distributed optical structures are each preferably arranged so as to be substantially unaffected by the presence of the other distributed optical structure. This would typically not be the case if written segments of diffractive element contours from each of the structures overlap. To avoid alteration of the transfer functions of the two sets of diffractive elements in regions where they overlap, some or all of the diffractive element contours are preferably written with a fill factor less than unity, and the written segments (i.e., diffracting regions) arranged so as not to overlap one another. This is illustrated in the enlarged portion of FIG. 5, where diffractive elements 515 are shown having a fill factor of about 0.25. By suitably positioning written segments of the diffractive elements to substantially avoid overlap, the spectral and spatial transfer function of the first set of diffractive elements exhibits essentially the same form it would have in the absence of the second set of diffractive elements and likewise for the spatial and spectral transfer function of the second set of diffractive elements. Additional sets of diffractive elements active to couple the input port to additional output ports with characteristic spatial and spectral transfer functions may be additionally overlaid. The average fill factor of each set of diffractive elements is preferably adjusted as necessary to substantially eliminate overlap of written contour segments. Partial-fill grayscale according to the present invention provides for the variation of relative diffractive element amplitude within a particular set of overlaid diffractive elements. Maximal diffractive element amplitude within a set of diffractive elements is preferably assigned a partial-fill factor that is less than unity by an amount sufficient to substantially reduce or eliminate overlap of written contour segments. Other diffraction elements within the set having smaller amplitudes are assigned proportionally smaller fill factors.

Figure 6:
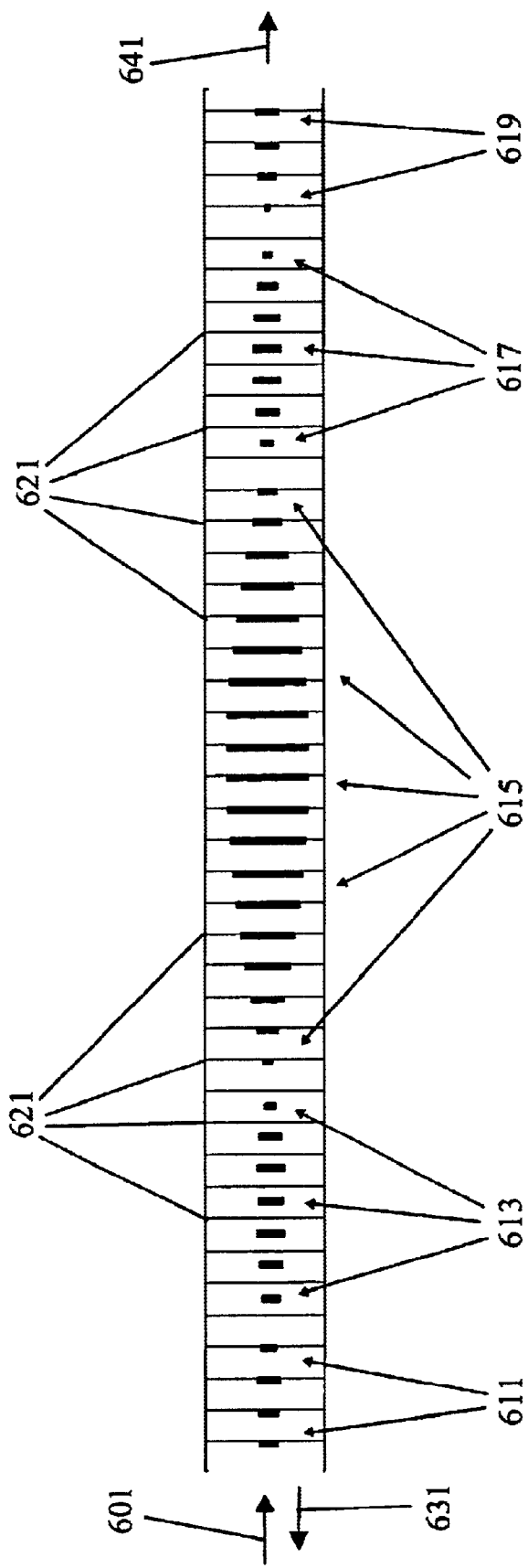
FIG. 6 is a schematic diagram of a distributed optical device implemented in a channel optical waveguide according to the present invention.

In channel waveguides, the diffractive elements comprising distributed optical structures are typically shorter (in transverse extent) since the input beam is confined in both transverse dimensions. The partial-fill gray-scale approach to controlling relative diffraction element amplitude may nevertheless be employed in a channel waveguide. An exemplary implementation of the present invention in a channel waveguide is schematically represented in FIG. 6, which shows a portion of a channel waveguide containing a distributed optical structure where partial-fill grayscale has been employed for relative diffractive element amplitude control. Input fields propagate from an input port 601 at the left end of the waveguide and encounter the distributed optical structure. The interaction of the input field with the distributed optical structure may generate a transmitted output field propagating forward through output port 641, and/or a back-reflected output field propagating backward through output port 631 (equivalent to input port 601 in this example). The channel waveguide is shown with a set of substantially uniformly spaced reference lines 621, which are preferably separated by one half of an in-guide reflected wavelength that would be produced by a distributed optical structure comprised of diffractive elements coincident with the reference lines.

The written segments (i.e., diffracting regions) of groups 611, 613, 615, 617, and 619 comprise the diffractive elements of the distributed optical structure. The diffractive elements may comprise any structural element, constituent, and/or alteration active to scatter a portion of the input field, and may specifically comprise trenches or ribs or other refractive index discontinuities or alterations in and/or near the channel waveguide boundaries and/or its interior, including diffractive elements recited elsewhere herein. The relative amplitudes of the various diffractive elements shown in FIG. 6 are controlled by varying their transverse extents to follow an approximate sinc function (i.e., sin(x)/x). However, the present invention is in no way limited to any specific pattern of diffractive element amplitude variation. Negative values of the sinc function are accommodated by introducing a spatial shift in the longitudinal position of the corresponding diffractive elements. Diffractive elements 613 and 617 therefore represent negative regions of the sinc function and are shifted by one half of the reference line spacing (i.e., one-quarter of the in-guide wavelength of the reflected wavelength). More generally, arbitrary relative phase shifts between the diffractive elements may be achieved by introducing longitudinal position shifts (using the linear relationship between spatial and phase shifts given by 180 degrees per quarter in-guide wavelength). Stated another way, the relative phase of the signal generated by an individual diffractive element may be phase shifted by an amount $\phi$ radians by keeping all aspects of the diffractive element the same and shifting its center by an amount $\Delta a = (\lambda/4\pi n_1)\phi$, where $\lambda$ is the operative free-space wavelength and $n_1$ is the effective waveguide refractive index.

This approach to phase shifting applies generally to any distributed optical structure, and is not limited to channel waveguides. In this channel waveguide exemplary embodiment, partial-fill grayscale is implemented by writing each diffractive element as a single written segment (i.e., diffracting region) whose written length (i.e., transverse extent) is controlled. More generally, each diffractive element may include multiple written segments or single written segments with spatially varying local amplitude. The relative amplitude of each diffractive element is determined by two factors. One is the integrated product of the local diffractive element amplitude times the local input field amplitude integrated over the length of the diffractive element. Since the input field will typically vary significantly across the channel waveguide, such variation need be taken into account in choosing the transverse extent of diffracting region(s) along the diffractive elements. An additional factor controlling the relative diffractive element amplitude as it pertains to the back reflected field is the overlap integral between the element's back-diffracted field and the back-directed mode of the waveguide.

Figure 7:
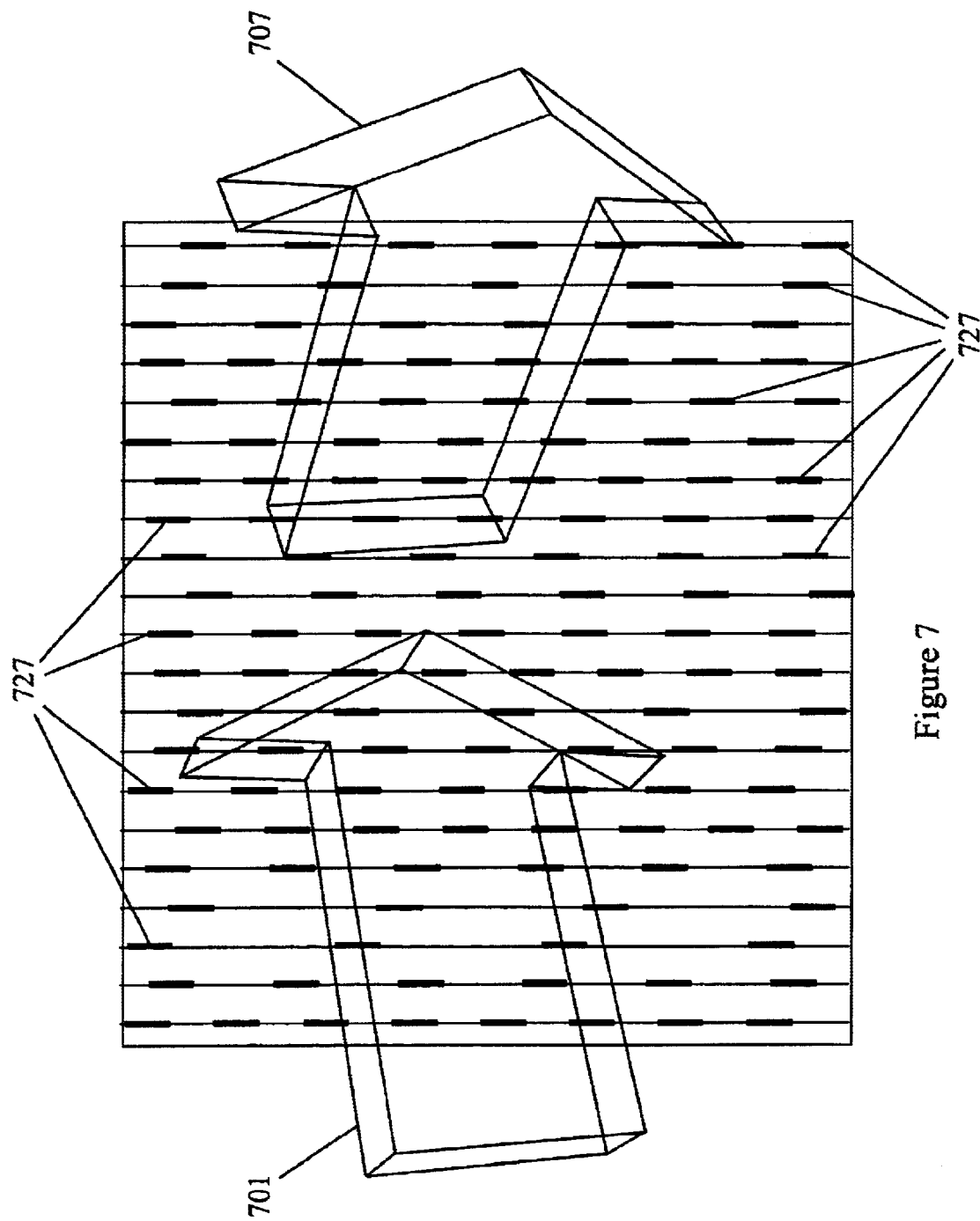
FIG. 7 is a schematic diagram of a distributed optical device implemented as an optical surface grating according to the present invention.

Another exemplary embodiment of the present invention is shown in FIG. 7, which depicts a diffraction grating comprising diffractive elements with various fill factors. The diffractive elements 727 lie within or on a surface and in the present example comprise essentially parallel contours. An input field propagates toward the surface of diffractive elements through input port 701 (here defined functionally, primarily by an input propagation direction), while the resulting diffracted output field propagates away from the surface of diffractive elements through output port 707 (also defined functionally primarily by an output propagation direction). The surface containing the diffractive elements may be substantially planar or of a more complex geometry. The diffraction grating may comprise a surface grating or a volume grating, and may comprise a reflection grating and/or a transmission grating. The diffracting region(s) on the diffractive elements may be: grooves, such as ruled marks, etched trenches, etched ribs, and/or holographically defined grooves; index discontinuities, variations, and/or modulations; metallic and/or dielectric coatings spatially-selectively applied, altered, and/or removed; and/or other suitable structural features or alterations active to diffract, reflect, and/or scatter portions of the input field. In this embodiment, the diffractive elements have various fill factors and have fill patterns including various numbers of fixed length written segments per unit length along the diffractive element contours. Other fill patterns may be equivalently employed. The control over relative diffractive amplitude of the various diffractive elements provides for the control over the spatial and spectral transfer function of the surface distributed optical structure. The relative amplitude of each diffractive element is proportional to the integral of the local diffractive element amplitude times the local input field amplitude integrated over the diffractive element contour. Partial fill of the diffractive element provides for broad control of this amplitude. In order to make the relative diffractive element amplitudes relatively insensitive to the profile of the input field, the length employed for scribed segments should be chosen small compared to the minimum anticipated input field distribution. A diffracted output field may be generated on the same side of the surface distributed optical structure as the input field (reflection grating) and/or on the opposite side (transmission grating). In either case, partial fill grayscale diffractive elements enable the detailed tailoring of the spectral transfer function of the output field(s).

Width-Based Gray Scale

A second method for controlling diffractive element scattering amplitude according to the present invention includes controlling the width, w, (equivalently, the thickness) of individual diffractive elements. The width or thickness of diffractive elements is easily controlled using standard contact and projection lithography, using stamping or embossing based fabrication, or by other spatially-selective fabrication methods.

Figure 8:
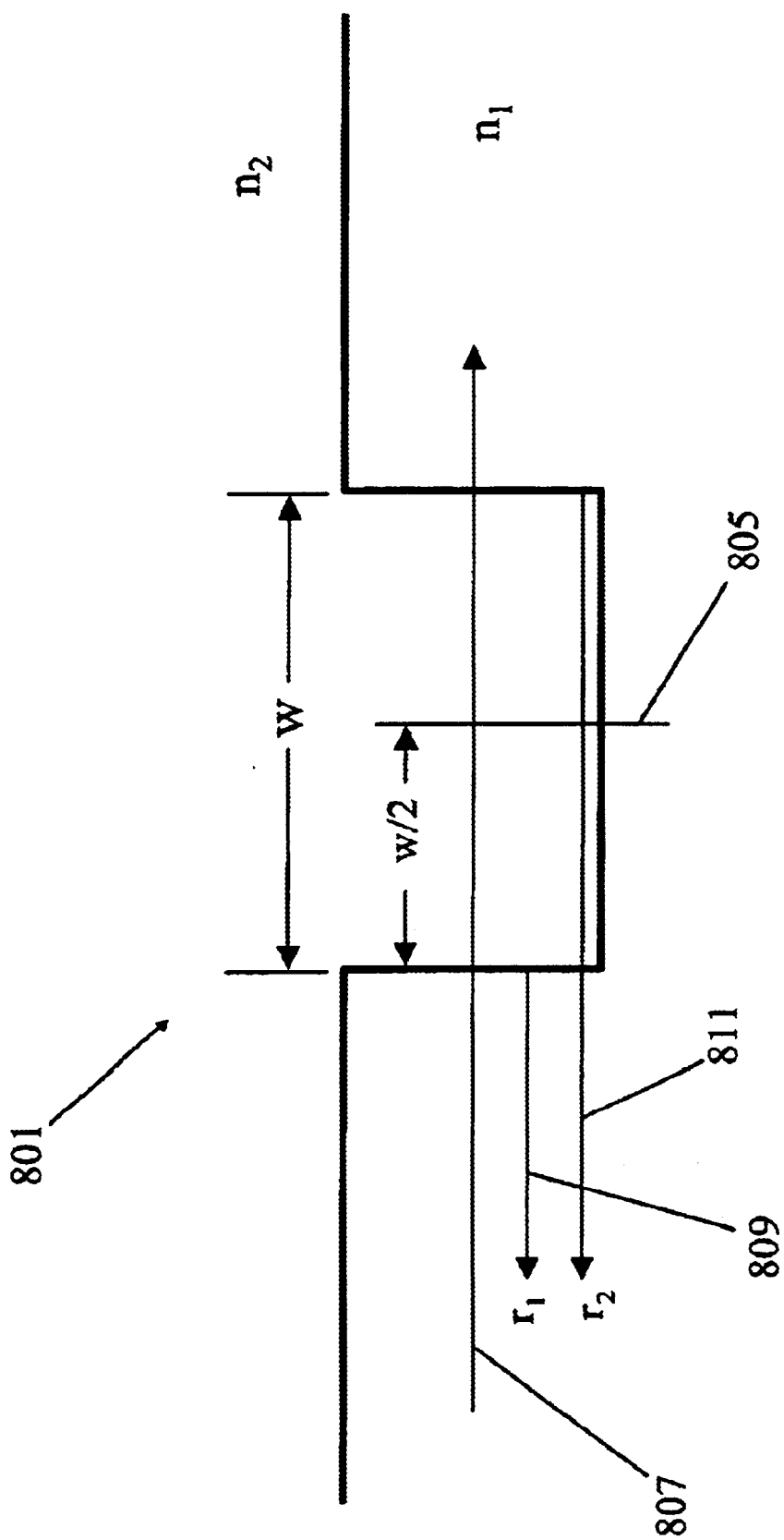
FIG. 8 is a cross-sectional view of an individual diffractive element according to the present invention.

The cross sectional profile of a single trench-type diffractive element 801 is shown in FIG. 8. Light incident through the waveguide 807 produces a reflected signal 809 from the front surface of the diffractive element and a reflected signal 811 from the back surface of the diffractive element. The two reflected signals add together coherently to create the net signal reflected (diffracted) back from the diffractive element. The phase difference of reflections 807 and 809 depends on the thickness of the diffractive element, w, and on the refractive index, $n_2$, of the diffractive element. In the limit that $n_1 \approx n_2$, the amplitude of the front and back surface reflections is essentially equal and the net reflected signal varies approximately as $\sin(2\pi n_2 w/\lambda)$, where $n_2$ is the refractive index within the diffractive element trench, w is the total width of the diffractive element, and $\lambda$ is the free space design wavelength. The net reflected signal amplitude exhibits a similar sinusoidal variation when $n_1$ and $n_2$ are significantly different from each other. However, depletion of the input signal by the front surface reflection prevents exact cancellation of the net reflection when the reflected components destructively interfere. When w is equal to approximately one quarter of the in-medium design wavelength the scattering amplitude is maximal. The scattering amplitude has the same maximal magnitude for each in-medium half wavelength ($\lambda/2n_2$) increase in the width. If the central position of the trench 805 is held fixed as the trench width is changed and $n_1 \approx n_2$, changes in diffractive element width lead to negligible phase changes in the diffracted signal. Phase changes are on the order of $2\pi(n_2-n_1)\Delta w/\lambda$, where $\Delta w$ is the width change. If $n_2-n_1 \approx 0.01$ and $\Delta w \approx \lambda/4n_2$, changes in reflected signal phase with changes in diffractive element width can be neglected for many purposes. It is clear that large changes in the scattering amplitude of a specific diffraction element can be achieved by controlling its trench width. While trench-like geometry has been described for specificity, considerations essentially identical follow for rib-type diffractive elements and indeed for any diffractive element comprising a front and back index discontinuity, variation, or modulation. In the case of irregular optical property spatial profiles, detailed simulation or empirical calibration are necessary to predictably exploit the variation in diffraction element spatial profile for amplitude control. To implement width-based (more generally: spatial-profile-based) diffractive element amplitude control, entire diffractive element contours may be continuously written with diffractive element profile varying as necessary from diffractive element to diffractive element. It may also be desirable to vary diffractive element profile along an individual diffractive element contour (variation within diffracting regions and/or among multiple diffracting regions), providing an additional degree of design control over the diffractive element transfer function. Profile-based and partial-fill gray scale may be used in combination with each other and/or in combination with additional diffractive element amplitude control factors such as feature depth or height. In general, variation of a spatial profile of an optical property within a diffracting region, from one diffracting region to another, and/or from one diffractive element to another enables nearly arbitrary determination of the transfer functions (element and collective transfer functions).

In summary, two powerful approaches to the control of diffractive element scattering amplitude are disclosed herein. The first, controlled contour filling or partial-fill gray scale, utilizes the fact that output fields arise from sub-fields generated by all points along a diffractive element contour. The second approach, width- or profile-based gray scale, utilizes interference between front- and back-generated reflections to control the net reflection (diffracted signal) from a diffractive element. The two methods may be used in combination as well as separately. The partial-fill gray scale approach is especially useful in cases where multiple distributed optical structures must be overlaid in a common region of space. Using partially filled diffractive element contours (i.e., diffractive elements not completely filled), distributed optical structures may be overlaid with little actual overlap between diffracting region(s) of the diffractive elements of the different structures. Control of diffractive element trench width or profile may be employed to adjust the scattering strength of overlapping contours to be a linear sum of their individual scattering strengths. Combination of both diffractive element amplitude control methods (partial-fill and profile-based) provides powerful means of achieving complicated spectral filtering functions as well as maintaining linearity in devices where multiple distributed optical structures must share the same space.

While the present disclosure has included exemplary embodiments that include distributed diffractive elements in planar waveguide, channel waveguide, and surface geometries, and on diffractive elements that are lithographically scribed, it is nevertheless the case that the methods and approaches presented herein are quite general and can be applied to distributed optical structures of diverse geometries comprising diffractive elements of a general nature active to scatter a portion of optical fields incident on them.

The present invention has been set forth in the forms of its preferred and alternative embodiments. It is nevertheless intended that modifications to the disclosed apparatus and methods employing amplitude and phase control in distributed optical structures may be made without departing from inventive concepts disclosed and/or claimed herein.

What is claimed is:

1. An optical apparatus, comprising:
   an optical element provided with at least one set of at least two diffractive elements,
   each diffractive element to diffract a corresponding diffracted component of an incident optical field with a corresponding diffractive element transfer function so that each set of the at least one diffractive element set collectively provides a corresponding overall set transfer function between a corresponding entrance optical port and a corresponding exit optical port, each diffractive element being spatially defined by a corresponding diffractive element contour and comprising at least one diffracting region thereof, the diffracting regions having at least one altered optical property so as to enable diffraction of a portion of the incident optical field therefrom, at least one of: i) the corresponding overall set transfer function; and ii) at least one corresponding diffractive element transfer function, being determined at least in part by at least one of: a) a less-than-unity fill factor for the corresponding contour; b) a non-uniform distribution of multiple diffracting regions of the corresponding contour; c) variation of a spatial profile of the optical property the at least one diffracting region of the corresponding contour; d) variation of a spatial profile of the optical property among multiple diffracting regions of the corresponding contour; and e) variation of the spatial profile of the optical property of the at least one diffracting region among elements in the at least one diffractive element set.

2. The apparatus of claim 1, the optical element being a waveguide, the waveguide substantially confining in at least one transverse dimension optical fields propagating therein, each of the diffractive element contours being a curvilinear contour, each of the diffracting regions being a curvilinear diffracting segment thereof.

3. The apparatus of claim 2, at least one corresponding diffractive element transfer function being determined at least in part by at least one of the less-than-unity fill factor for the corresponding contour and the non-uniform distribution of multiple diffracting segments of the corresponding contour.

4. The apparatus of claim 3, the at least one diffracting segment of at least one corresponding contour comprising a plurality of curvilinear diffracting segments.

5. The apparatus of claim 4, the curvilinear diffracting segments of at least one corresponding contour being of substantially the same length and substantially uniformly spaced along the corresponding contour.

6. The apparatus of claim 4, the curvilinear diffracting segments of at least one corresponding contour being of substantially irregularly varying lengths and substantially irregularly spaced along the corresponding contour.

7. The apparatus of claim 4, the curvilinear diffracting segments of at least one corresponding contour being of varying lengths so that a local fill factor for the corresponding contour filled varies along the length of the contour.

8. The apparatus of claim 3, the waveguide being provided with a second diffractive element set of at least two diffractive elements, the second diffractive element set being at least partially spatially overlapped with a first diffractive element set, each element of the second diffractive element set to diffract a corresponding diffracted component of the incident optical field with a corresponding diffractive element transfer function so that the second diffractive element set collectively provides a second overall set transfer function between a second entrance optical port and a second exit optical port, each element of the second diffractive element set being spatially defined by a corresponding diffractive element curvilinear contour and comprising at least one diffracting segment thereof, the diffracting segments having an altered optical property so as to enable diffraction of a portion of the incident optical field therefrom, the corresponding diffractive element transfer function of at least one element of the second diffractive element set being determined at least in part by at least one of a less-than-unity fill factor for the corresponding contour and a non-uniform distribution of multiple diffracting segments of the corresponding contour, the at least one diffracting segment of at least one element of at least one of the first and second diffractive element sets comprising a plurality of curvilinear diffracting segments.

9. The apparatus of claim 8, corresponding pluralities of diffracting segments of intersecting contours being arranged along the intersecting contours so that the diffracting segments do not substantially intersect.

10. The apparatus of claim 8, the waveguide being provided with at least three optical ports.

11. The apparatus of claim 3, the at least one diffracting segment of the corresponding contours being collectively arranged so that substantially any portion of an optical field propagating from the entrance optical port encounters a substantially similar number of diffracting segments among the diffractive element set, thereby resulting in a substantially spatially uniform corresponding overall set transfer function between the corresponding entrance optical port and the corresponding exit optical port.

12. The apparatus of claim 2, the waveguide comprising a core and lower-index cladding for substantially confining optical fields propagating therein.

13. The apparatus of claim 12, the diffracting segments comprising grooves in the core, the grooves being filled with cladding.

14. The apparatus of claim 12, the diffracting segments comprising ridges of the core protruding into the cladding.

15. The apparatus of claim 2, an index differential between the waveguide and a surrounding volume serving to substantially confine optical fields propagating therein.

16. The apparatus of claim 15, the diffracting segments comprising grooves in the waveguide.

17. The apparatus of claim 15, the diffracting segments comprising ridges protruding from the waveguide.

18. The apparatus of claim 2, at least one corresponding diffractive element transfer function being determined at least in part by the thickness and the effective index of the at least one diffracting segment.

19. The apparatus of claim 18, at least one of the thickness and the effective index of the at least one diffracting segment varying along the corresponding contour.

20. The apparatus of claim 2, the waveguide being provided with at least two optical ports.

21. The apparatus of claim 2, the optical element being a planar waveguide, the planar waveguide substantially confining in one transverse dimension optical fields propagating in two dimensions therein.

22. The apparatus of claim 2, the optical element being a channel waveguide, the channel waveguide substantially confining in two transverse dimensions optical fields propagating in one dimension therein.

23. The apparatus of claim 2, the diffracting segments being provided lithographically.

24. The apparatus of claim 2, the diffracting segments being provided by spatially-selective optically-induced optical densification of the waveguide.

25. The apparatus of claim 2, the diffracting segments being provided by spatially-selective mechanically-induced optical densification of the waveguide.

26. The apparatus of claim 2, the diffracting segments being provided by spatially-selective doping of the waveguide.

27. The apparatus of claim 2, the diffracting segments being provided holographically.

28. The apparatus of claim 2, the corresponding overall set transfer function being determined at least in part by the relative positions of the corresponding diffractive element contours.

29. The apparatus of claim 2, at least one corresponding element transfer function being determined at least in part by at least one of: variation of the spatial profile of the optical property along the at least one diffracting segment of the corresponding contour, and variation of the spatial profile of the optical property among multiple diffracting segments of the corresponding contour.

30. The apparatus of claim 2, at least one corresponding overall set transfer function being determined at least in part by variation of the spatial profile of the optical property of the diffracting segments among the elements of the corresponding diffractive element set.

31. The apparatus of claim 1, the optical element enabling propagation of optical fields in three dimensions therein,
   each of the diffractive element contours being a surface contour, each of the diffracting regions being a diffracting surface areal segment.

32. The apparatus of claim 31, at least one corresponding diffractive element transfer function being determined at least in part by at least one of the less-than-unity fill factor for the corresponding contour and the non-uniform distribution of multiple diffracting surface areal segments of the corresponding contour.

33. The apparatus of claim 32, the at least one diffracting surface areal segment of at least one corresponding contour comprising a plurality of diffracting surface areal segments.

34. The apparatus of claim 32, the diffracting surface areal segments of at least one corresponding surface contour being of substantially the same area and substantially uniformly arranged over the corresponding surface contour.

35. The apparatus of claim 33, the diffracting surface areal segments of at least one diffractive element being of substantially irregularly varying areas and substantially irregularly arranged over the corresponding surface contour.

36. The apparatus of claim 33, the diffracting surface areal segments of at least one corresponding surface contour being of varying areas so that a local fill factor for the corresponding surface contour varies across the contour.

37. The apparatus of claim 32, the optical element being provided with a second diffractive element set of at least two diffractive elements, the second diffractive element set being at least partially spatially overlapped with the first diffractive element set,
   each element of the second diffractive element set to diffract a corresponding diffracted component of the incident optical field with a corresponding diffractive element transfer function so that the second diffractive element set collectively provides a second overall set transfer function between a second entrance optical port and a second exit optical port,
   each element of the second diffractive element set being spatially defined by a corresponding diffractive element surface contour and comprising at least one diffracting surface areal segment thereof, the diffracting surface areal segments having an altered optical property so as to enable diffraction of a portion of the incident optical field therefrom,
   the corresponding diffractive element transfer function of at least one element of the second diffractive element set being determined at least in part by at least one of a less-than-unity fill factor for the corresponding contour and a non-uniform distribution of multiple diffracting surface areal segments of the corresponding contour,
   the at least one diffracting surface areal segment of at least one element of at least one of the first and second diffractive element sets comprising a plurality of diffracting surface areal segments.

38. The apparatus of claim 37, corresponding pluralities of diffracting surface areal segments of intersecting surface contours being arranged on the intersecting surface contours so that the diffracting surface areal segments do not substantially intersect.

39. The apparatus of claim 37, the optical element being provided with at least three optical ports.

40. The apparatus of claim 32, the at least one diffracting surface areal segment of the corresponding surface contour being collectively arranged so that substantially any portion of an optical field propagating from the entrance optical port encounters a substantially similar number of diffracting surface areal segments among the diffractive element set, thereby resulting in a substantially spatially uniform corresponding overall set transfer function between the corresponding entrance optical port and the corresponding exit optical port.

41. The apparatus of claim 31, at least one corresponding diffractive element transfer function being determined at least in part by the thickness and the effective index of the at least one diffracting surface areal segment.

42. The apparatus of claim 41, at least one of the thickness and the effective index on the at least one diffracting segment varying across the corresponding contour.

43. The apparatus of claim 31, the optical element being provided with at least two optical ports.

44. The apparatus of claim 31, the diffractive elements being provided holographically.

45. The apparatus of claim 31, the corresponding overall set transfer function being determined at least in part by the relative positions of the corresponding diffractive element contours.

46. The apparatus of claim 31, at least one corresponding element transfer function being determined at least in part by at least one of: variation of the spatial profile of the optical property along the at least one diffracting segment across the corresponding contour, and variation of the spatial profile of the optical property among multiple diffracting surface areal segments of the corresponding contour.

47. The apparatus of claim 31, at least one corresponding overall set transfer function being determined at least in part by variation of the spatial profile of the optical property of the diffracting segments among the elements of the corresponding diffractive element set.

48. The apparatus of claim 1,
   the optical element being a diffraction grating,
   each of the diffractive element contours being a curvilinear contour, each of the diffracting regions being a curvilinear diffracting segment thereof.

49. The apparatus of claim 48, at least one corresponding diffractive element transfer function being determined at least in part by at least one of the less-than-unity fill factor for the corresponding contour and the non-uniform distribution of multiple diffracting segments of the corresponding contour.

50. The apparatus of claim 49, the at least one diffracting segment of at least one corresponding contour comprising a plurality of curvilinear diffracting segments.

51. The apparatus of claim 50, the curvilinear diffracting segments of at least one corresponding contour being of substantially the same length and substantially uniformly spaced along the corresponding contour.

52. The apparatus of claim 50, the curvilinear diffracting segments of at least one corresponding contour being of substantially irregularly varying lengths and substantially irregularly spaced along the corresponding contour.

53. The apparatus of claim 50, the curvilinear diffracting segments of at least one corresponding contour being of varying lengths so that a local fill factor for the corresponding contour filled varies along the length of the contour.

54. The apparatus of claim 49, the at least one diffracting segment of the corresponding contour being collectively arranged so that substantially any portion of an optical field propagating from the entrance optical port encounters a substantially similar number of diffracting segments among the diffractive element set, thereby resulting in a substantially spatially uniform corresponding overall set transfer function between the corresponding entrance optical port and the corresponding exit optical port.

55. The apparatus of claim 49, the diffraction grating being provided with a second diffractive element set of at least two diffractive elements, the second diffractive element set being at least partially spatially overlapped a first diffractive element set, each element of the second diffractive element set to diffract a corresponding diffracted component of the incident optical field with a corresponding diffractive element transfer function so that the second diffractive element set collectively provides a second overall set transfer function between a second entrance optical port and a second exit optical port, each element of the second diffractive element set being spatially defined by a corresponding diffractive element curvilinear contour and comprising at least one diffracting segment thereof, the diffracting segments having an altered optical property so as to enable diffraction of a portion of the incident optical field therefrom, the corresponding diffractive element transfer function of at least one element of the second diffractive element set being determined at least in part by at least one of a less-than-unity fill factor for the corresponding contour and a non-uniform distribution of multiple diffracting segments of the corresponding contour, the at least one diffracting segment of at least one element of at least one of the first and second diffractive element sets comprising a plurality of curvilinear diffracting segments.

56. The apparatus of claim 55, corresponding pluralities of diffracting segments of intersecting contours being arranged along the intersecting contours so that the diffracting segments do not substantially intersect.

57. The apparatus of claim 55, the diffraction grating being provided with at least three optical ports.

58. The apparatus of claim 48, the diffraction grating being a volume grating.

59. The apparatus of claim 58, at least one corresponding diffractive element transfer function being determined at least in part by the thickness and the effective index of the corresponding diffracting segment.

60. The apparatus of claim 58, the diffracting segments comprising segments having a refractive index lower than the average refractive index of the volume grating.

61. The apparatus of claim 58, the diffracting segments being provided by spatially-selective optically-induced optical densification of the volume grating.

62. The apparatus of claim 58, the diffracting segments being provided by spatially-selective mechanically-induced optical densification of the volume grating.

63. The apparatus of claim 58, the diffracting segments being provided by spatially-selective doping of the volume grating.

64. The apparatus of claim 58, the diffracting segments being provided holographically.

65. The apparatus of claim 48, the diffraction grating being a surface grating.

66. The apparatus of claim 65, at least one corresponding diffractive element transfer function being determined at least in part by a groove depth of the corresponding diffracting segment.

67. The apparatus of claim 65, at least one corresponding diffractive element transfer function being determined at least in part by a groove shape of the corresponding diffracting segment.

68. The apparatus of claim 65, the diffracting segments being provided holographically.

69. The apparatus of claim 65, the diffracting segments being provided lithographically.

70. The apparatus of claim 65, the diffracting segments being provided by ruling the surface grating.

71. The apparatus of claim 48, the diffraction grating being provided with at least two optical ports.

72. The apparatus of claim 48, the diffraction grating being a reflection grating.

73. The apparatus of claim 48, the diffraction grating being a transmission grating.

74. The apparatus of claim 58, the diffracting segments comprising segments having a refractive index higher than the average refractive index of the volume grating.

75. The apparatus of claim 48, the corresponding overall set transfer function being determined at least in part by the relative positions of the corresponding diffractive element contours.

76. The apparatus of claim 48, at least one corresponding element transfer function being determined at least in part by at least one of: variation of the spatial profile of the optical property along the at least one diffracting segment of the corresponding contour, and variation of the spatial profile of the optical property among multiple diffracting segments of the corresponding contour.

77. The apparatus of claim 48, at least one corresponding overall set transfer function being determined at least in part by variation of the spatial profile of the optical property of the diffracting segments among the elements of the corresponding diffractive element set.

78. An optical apparatus, comprising:

a waveguide provided with a plurality diffractive elements, the waveguide substantially confining in at least one transverse dimension optical fields propagating therein, each diffractive element to diffract a corresponding diffracted component of an incident optical field with a corresponding diffractive element transfer function so that the diffractive elements collectively provide an overall transfer function between an entrance optical port and an exit optical port, each diffractive element being spatially defined by a corresponding curvilinear diffractive element contour and comprising at least one diffracting segment thereof, the diffracting segments having an altered optical property so as to enable diffraction of a portion of the incident optical field therefrom, at least one of: i) the overall transfer function; and ii) at least one corresponding diffractive element transfer function, being determined at least in part by at least one of: a) a less-than-unity fill factor for the corresponding contour; b) a non-uniform distribution of multiple diffracting regions of the corresponding contour; c) variation of a spatial profile of the optical property along the at least one diffracting region along the corresponding contour; d) variation of a spatial profile of the optical property among multiple diffracting regions of the corresponding contour; and e) variation of the spatial profile of the optical property of the at least one diffracting region among the diffractive elements.

79. The apparatus of claim 78, at least one corresponding diffractive element transfer function being determined at least in part by at least one of the less-than-unity fill factor for the corresponding contour and the non-uniform distribution of multiple diffracting segments of the corresponding contour.

80. The apparatus of claim 79, the at least one diffracting segment of at least one corresponding contour comprising a plurality of curvilinear diffracting segments.

81. The apparatus of claim 79, the at least one diffracting segment of the corresponding contours being collectively arranged so that substantially any portion of an optical field propagating from the entrance optical port encounters a substantially similar number of diffracting segments among the diffractive elements, thereby resulting in a substantially spatially uniform overall transfer function between the entrance optical port and the exit optical port.

82. The apparatus of claim 78, at least one corresponding diffractive element transfer function being determined at least in part by the thickness and the refractive index of the at least one diffracting segment.

83. The apparatus of claim 78, the overall transfer function being determined at least in part by the relative positions of the corresponding diffractive element contours.

84. The apparatus of claim 78, at least one corresponding element transfer function being determined at least in part by at least one of: variation of the spatial profile of the optical property along the at least one diffracting segment of the corresponding contour, and variation of the spatial profile of the optical property among multiple diffracting segments of the corresponding contour.

85. The apparatus of claim 78, the overall transfer function being determined at least in part by variation of the spatial profile of the optical property of the diffracting segments among the diffractive elements.

86. An optical apparatus, comprising:
   a waveguide provided with first and second diffractive element sets, the waveguide substantially confining in at least one transverse dimension optical fields propagating therein,
   the first and second diffractive element sets being at least partially spatially overlapped;
   each of the first and second diffractive elements sets including a plurality diffractive elements,
   each diffractive element to diffract a corresponding diffracted component of an incident optical field with a corresponding diffractive element transfer function so that the first and second diffractive element sets collectively provide corresponding first and second overall transfer functions between corresponding first and second entrance optical ports and corresponding first and second exit optical ports,
   each diffractive element being spatially defined by a corresponding curvilinear diffractive element contour and comprising at least one diffracting segment thereof, the diffracting segments having an altered optical property so as to enable diffraction of a portion of the incident optical field therefrom,
   at least one of: i) the first overall set transfer function; ii) the second overall set transfer function; and iii) at least one corresponding diffractive element transfer function, being determined at least in part by at least one of: a) a less-than-unity fill factor for the corresponding contour; b) a non-uniform distribution of multiple diffracting regions of the corresponding contour; c) variation of a spatial profile of the optical property along the at least one diffracting region of the corresponding contour; d) variation of a spatial profile of the optical property among multiple diffracting segments of the corresponding contour; and e) variation of the spatial profile of the optical property of the at least one diffracting region among the diffractive elements of at least one of the first and second diffractive element sets.

87. The apparatus of claim 86, at least one corresponding diffractive element transfer function being determined at least in part by at least one of the less-than-unity fill factor for the corresponding contour and the non-uniform distribution of multiple diffracting segments of the corresponding contour.

88. The apparatus of claim 87, the at least one diffracting segment of at least one element of at least one of the first and second diffractive element sets comprising a plurality of curvilinear diffracting segments.

89. The apparatus of claim 87,
   the at least one diffracting segment of at least one element of at least one of the first and second diffractive element sets comprising a plurality of curvilinear diffracting segments,
   corresponding pluralities of diffracting segments of intersecting contours being arranged along the intersecting contours so that the diffracting segments do not substantially intersect.

90. The apparatus of claim 86, at least one corresponding diffractive element transfer function being determined at least in part by the thickness and the refractive index of the at least one diffracting segment.

91. The apparatus of claim 86, at least one corresponding overall set transfer function being determined at least in part by the relative positions of the corresponding diffractive element contours.

92. The apparatus of claim 86, at least one corresponding element transfer function being determined at least in part by at least one of: variation of the spatial profile of the optical property along the at least one diffracting segment of the corresponding contour, and variation of the spatial profile of the optical property among multiple diffracting segments of the corresponding contour.

93. The apparatus of claim 86, at least one corresponding overall set transfer function being determined at least in part by variation of the spatial profile of the optical property of the diffracting segments among the elements of the corresponding diffractive element set.

* * * * *